(12) United States Patent
Athad

(10) Patent No.: US 8,647,028 B2
(45) Date of Patent: Feb. 11, 2014

(54) CUTTING TOOL AND DOUBLE-ENDED CUTTING INSERT THEREFOR

(75) Inventor: Shimon Athad, Maalot (IL)

(73) Assignee: Iscar, Ltd., Tefen (IL)

( * ) Notice: Subject to any disclaimer, the term of this patent is extended or adjusted under 35 U.S.C. 154(b) by 468 days.

(21) Appl. No.: 12/967,929

(22) Filed: Dec. 14, 2010

(65) Prior Publication Data

US 2011/0158756 A1    Jun. 30, 2011

(30) Foreign Application Priority Data

Dec. 29, 2009  (IL) .......................................... 203014

(51) Int. Cl.
*B23B 27/04*  (2006.01)
*B23B 27/14*  (2006.01)

(52) U.S. Cl.
USPC ........... 407/110; 407/109; 407/113; 407/117; 407/50

(58) Field of Classification Search
USPC ........ 407/117, 109, 110, 113, 107, 50, 41, 49
See application file for complete search history.

(56) References Cited

U.S. PATENT DOCUMENTS

| | | | | |
|---|---|---|---|---|
| 4,992,007 A * | 2/1991 | Satran | ......................... | 407/110 |
| 5,156,502 A | 10/1992 | Satran | | |
| 5,360,298 A * | 11/1994 | Hedlund | ....................... | 407/110 |
| 5,411,354 A * | 5/1995 | Gustafsson | .................... | 407/110 |
| 5,829,924 A * | 11/1998 | Oshnock et al. | .............. | 407/110 |
| 5,975,812 A * | 11/1999 | Friedman | ....................... | 407/114 |
| 6,139,227 A * | 10/2000 | Schafer et al. | ................ | 407/110 |
| 6,176,649 B1 * | 1/2001 | Friedman | ....................... | 407/110 |
| 6,238,147 B1 * | 5/2001 | Tagtstrom et al. | ............ | 407/117 |
| 6,241,429 B1 * | 6/2001 | Schafer et al. | ................ | 407/110 |
| 6,244,790 B1 * | 6/2001 | Kingdom et al. | .............. | 407/110 |
| 6,428,247 B1 * | 8/2002 | Friedman | ....................... | 407/110 |
| 6,702,529 B1 * | 3/2004 | Tagtstrom et al. | ............ | 407/110 |
| 6,742,971 B2 * | 6/2004 | Tong | ............................. | 407/117 |
| 7,163,361 B2 | 1/2007 | Hecht | | |
| 7,896,585 B2 * | 3/2011 | Hecht | ........................... | 407/110 |
| 2005/0232712 A1 | 10/2005 | Hecht | | |
| 2006/0147281 A1 * | 7/2006 | Nagaya et al. | ................ | 407/117 |

FOREIGN PATENT DOCUMENTS

JP        53 114588        10/1978
WO    WO 2008/133199 A1 * 11/2008    .................... 407/113

OTHER PUBLICATIONS

International Search Report in PCT/IL2010/001005, dated Mar. 10, 2011.

* cited by examiner

*Primary Examiner* — Andrea Wellington
*Assistant Examiner* — Brendan Ayer
(74) *Attorney, Agent, or Firm* — Womble Carlyle

(57) ABSTRACT

A cutting tool for grooving, parting and turning machining operations is capable of grooving to unlimited depths of cut. The cutting tool includes an indexable double-ended cutting insert having a downwardly extending insert clamping portion resiliently clamped in a self-retaining manner in an insert pocket so that chip formation is not hindered during such machining operations.

12 Claims, 4 Drawing Sheets

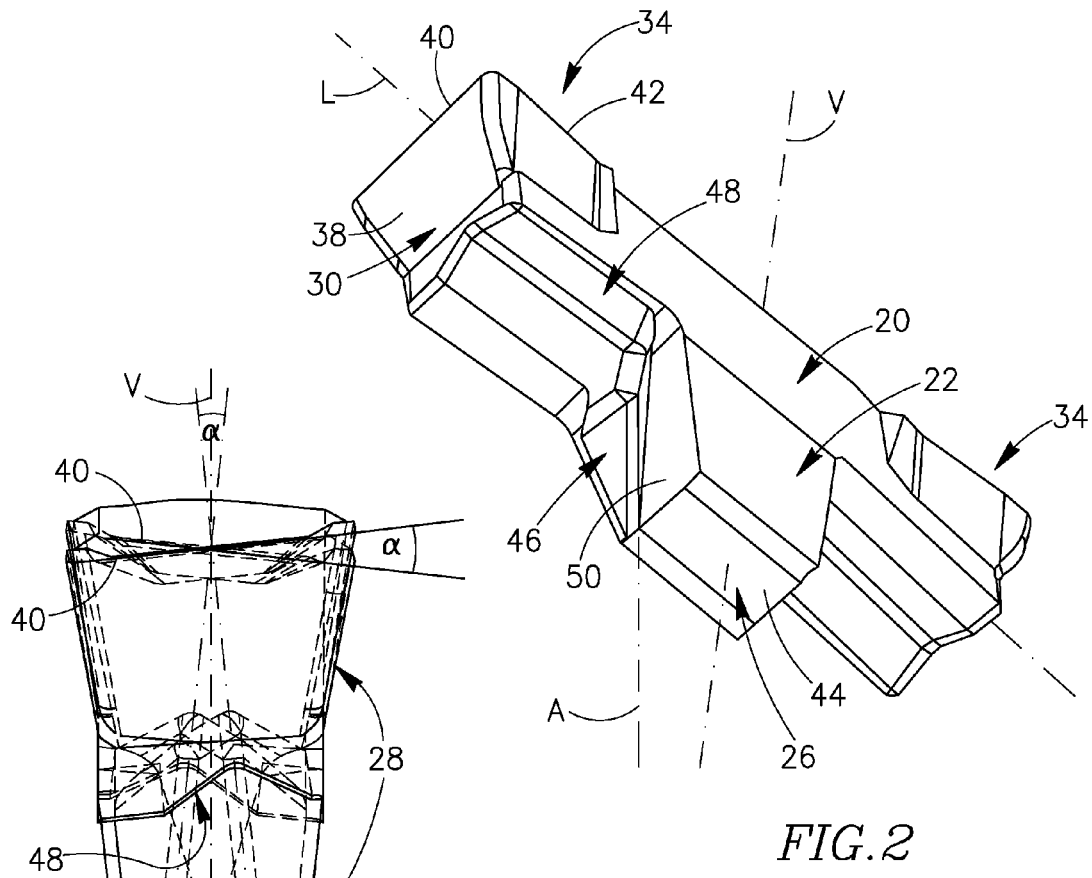
FIG.2
FIG.3
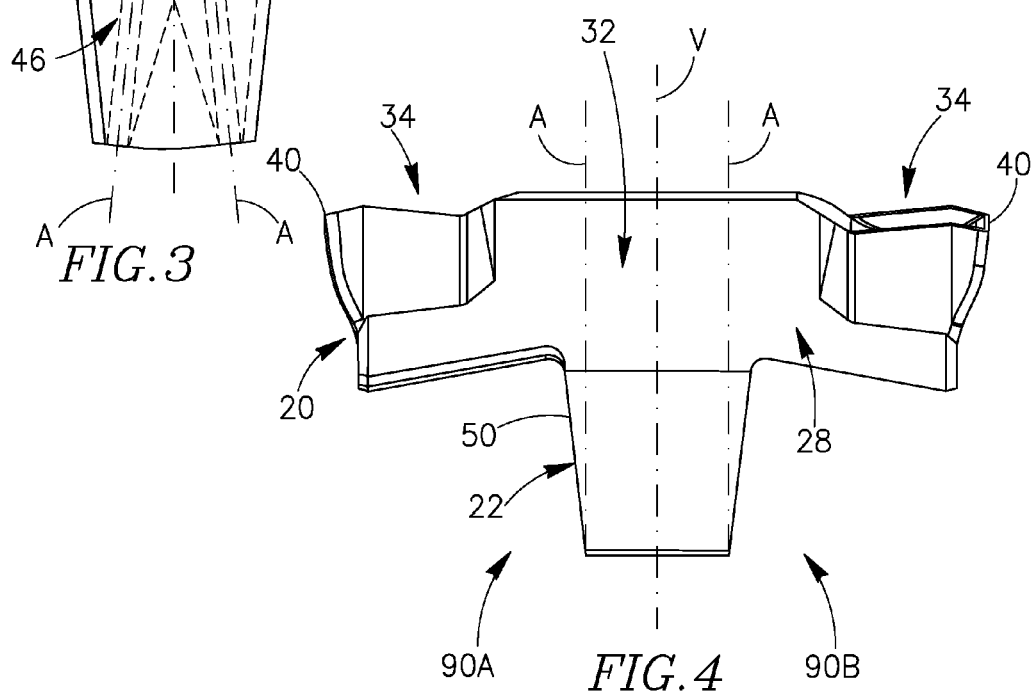
FIG.4

CUTTING TOOL AND DOUBLE-ENDED CUTTING INSERT THEREFOR

FIELD OF THE INVENTION

The present invention relates to cutting tools for grooving, parting and turning machining operations capable of grooving to unlimited depths of cut.

BACKGROUND OF THE INVENTION

Such a cutting tool is disclosed, for example, in U.S. Pat. No. 7,163,361. A cutting insert is retained in an insert pocket of an insert holder via a forward upright V-shaped surface, an opposing flat rear surface and a V-shaped locating surface associated with the cutting portion. No securing member adjacent the rake surface of the cutting insert is required to secure the cutting insert to the insert pocket, therefore chip formation during a cutting process goes undisturbed, on the other hand, the cutting insert has only one cutting portion.

U.S. Pat. No. 5,156,502 discloses a double-ended cutting insert having a cutting portion at each end. The cutting insert is designed so that the cutting tool has an unlimited depth of cut. The cutting insert is securely retained in the insert holder between a pair of jaws. The jaw which abuts the upper surface of the central body portion of the cutting insert may well disturb chip formation of chips cut from a workpiece by the front cutting edge of the cutting insert.

SUMMARY OF THE INVENTION

In accordance with the present invention there is provided an indexable double-ended cutting insert. The cutting insert has a vertical insert symmetry axis V about which the cutting insert has 180° rotational symmetry. The insert symmetry axis V defines an upward to downward direction.

The cutting insert comprises:
an insert upper surface, an opposing insert lower surface, two opposing insert side surfaces extending therebetween, and opposing end surfaces extending between the insert upper and lower surfaces and between the insert side surfaces;
a longitudinally extending body portion having a central portion and two insert cutting portions located at opposite ends of the body portion and formed integrally with the central portion; and
an insert clamping portion extending downwardly from the central portion in a direction away from the insert upper surface.

Each insert cutting portion has a rake surface formed in the insert upper surface and a relief surface adjacent the rake surface. The rake and relief surfaces meet at an edge, at least a portion of the edge forms a front cutting edge.

The insert lower surface comprises a bottom surface which is located on the insert clamping portion and faces in a direction away from the insert upper surface, two insert abutment surfaces, two first locating surfaces and two second locating surfaces. The two first locating surfaces and two insert abutment surfaces are located on the insert clamping portion; each first locating surface and each insert abutment surface extends from the bottom surface towards a respective adjacent second locating surface; and each second locating surface is located on a respective insert cutting portion. Each first locating surface defines an insert locating axis A. In an end view of the cutting insert, the insert locating axes A of the two first locating surfaces form an angle α therebetween.

According to embodiments of the present invention, in an end view of the cutting insert, each insert locating axis A, associated with a front cutting edge on one half of the cutting insert, is perpendicular to a front cutting edge located on a second half of the cutting insert.

According to embodiments of the present invention, the insert locating axes A are parallel to each other in a side view of the cutting insert.

According to embodiments of the present invention, in a side view of the cutting insert the insert symmetry axis V is located midway between, and is parallel to, the insert locating axes A.

According to embodiments of the present invention, the insert abutment surfaces converge downwardly and are inclined to the insert locating axes A.

According to embodiments of the present invention, the insert abutment surfaces are flat.

According to embodiments of the present invention, each insert abutment surface is transverse to an adjacent second locating surface and the bottom surface.

According to embodiments of the present invention, the relief surfaces are located in respective end surfaces and the front cutting edges are straight and form the angle α therebetween.

In accordance with the present invention, there is provided an insert holder which comprises:
two parallel holder side surfaces and a front surface extending between the holder side surfaces; and
an insert pocket, the insert pocket having a pocket upper portion and a pocket clamping portion defining an upward to downward direction.

The pocket clamping portion comprises a resilient clamping jaw at a front end of the insert pocket. The clamping jaw has a wedge surface which has a wedge abutment surface; a wedge extension surface located on the wedge surface separates the wedge abutment surface from the holder side surfaces and from an upwardly facing upper locating surface.

The clamping jaw connects to a rigid base jaw which forms a single integrated piece therewith. The base jaw has a base locating surface which faces opposite the wedge surface. The pocket upper portion comprises a cutting portion housing and the upper locating surface. The cutting portion housing is located rearward of the pocket clamping portion in a side view of the insert holder, and the upper locating surface is located on the clamping jaw. When a cutting insert is securely clamped in the insert pocket, the cutting portion housing accommodates a non-operative cutting portion of the cutting insert and only the upper locating surface, the wedge abutment surface and the base locating surface abut given surfaces on the cutting insert.

According to embodiments of the present invention, the wedge abutment surface is flat.

According to embodiments of the present invention, the base locating surface and the wedge abutment surface converge downwardly in a direction away from the pocket upper portion.

According to embodiments of the present invention, the cutting portion housing has a housing locating surface extending from and transverse to the base locating surface.

According to embodiments of the present invention, in an end view of the insert holder the base locating axis B and the wedge bisector N are located midway between and are parallel to the holder side surfaces.

According to embodiments of the present invention, the upper locating surface extends transversely to the wedge surface and to the front surface.

In accordance with the present invention, there is also provided a cutting tool which comprises the insert holder with the cutting insert clamped therein. The second locating surface associated with an operative cutting portion abuts the upper locating surface of the insert holder; the insert abutment surface associated with the operative cutting portion abuts the wedge abutment surface of the insert holder; and the first locating surface associated with the non-operative cutting portion abuts the base locating surface of the insert holder.

According to embodiments of the present invention, when the cutting tool performs a machining operation, the second locating surface associated with the non-operative cutting portion abuts the housing locating surface.

BRIEF DESCRIPTION OF THE DRAWINGS

For a better understanding of the present invention and to show how the same may be carried out in practice, reference will now be made to the accompanying drawings, in which:

FIG. 2 is an isometric bottom view of the cutting insert shown in FIG. 1;

FIG. 3 is an end view of the cutting insert of FIG. 1, showing hidden lines;

FIG. 4 is a side view of the cutting insert of FIG. 1;

Figure 1:
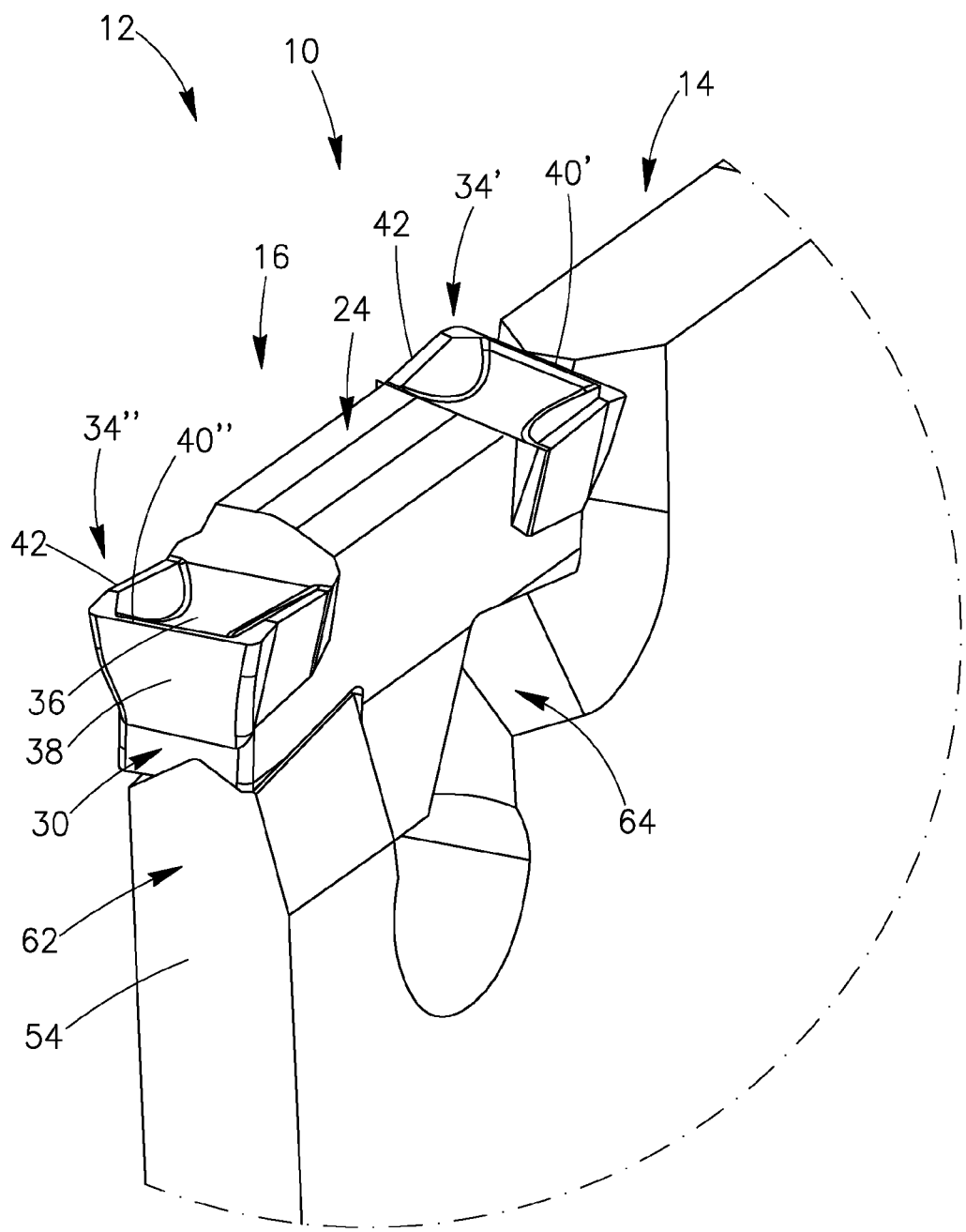
FIG. 1 is an isometric view of an assembled tool cutting portion with a cutting insert secured in an insert pocket according to embodiments of the present invention.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Reference is made to FIG. 1, showing an isometric view of an assembled tool cutting portion 10 of a cutting tool 12 in accordance with embodiments of the invention. The cutting tool 12 my have any required shape. The tool cutting portion 10 includes an insert holder 14 and an indexable double-ended cutting insert 16 releasably retainable in an insert pocket 18 on the insert holder 14. The insert holder 14 is typically made of metal, such as steel. The cutting insert 16 is typically made of extremely hard and wear-resistant material such as cemented carbide, either by form-pressing or by injection molding and sintering carbide powders in a binder. The cemented carbide may be, for example, tungsten carbide. The cutting insert 16 may be coated or uncoated.

Reference is made to FIGS. 2 to 4. The cutting insert 16 has a longitudinally extending body portion 20, an insert clamping portion 22 and opposing insert upper and lower surfaces 24, 26. The cutting insert 16 has a 180° rotational symmetry about a vertical insert symmetry axis V which passes through the insert upper and lower surfaces 24, 26 and defines an upward to downward direction. The cutting insert 16 has two opposing insert side surfaces 28 extending between the insert upper and lower surfaces 24, 26. The cutting insert 16 has opposing end surfaces 30 extending between the insert upper and lower surfaces 24, 26 and between the insert side surfaces 28. The body portion 20 includes a central portion 32 and two insert cutting portions 34 located at opposite ends of the body portion 20 and formed integrally with the central portion 32. According to some embodiments, each insert cutting portion 34 includes a rake surface 36 formed in the insert upper surface 24, a relief surface 38 formed on an associated end surface 30 and a front cutting edge 40 formed by the intersection of the rake surface 36 and the relief surface 38. In accordance with some embodiments, the cutting insert 16 may also be provided with side cutting edges 42, formed at the intersection of the insert side surfaces 28 with the rake surface 36. In accordance with some embodiments, each front cutting edge 40 is straight in an end view of the cutting insert 16.

The insert clamping portion 22 extends downwards from the central portion 32. The insert lower surface 26 includes a bottom surface 44 located on the insert clamping portion 22 and facing in a direction away from the insert upper surface 24. The insert lower surface 26 further includes two first locating surfaces 46 located on opposite ends of the insert clamping portion 22 and facing opposite directions. Each first locating surface 46 (clamping portion locating surface 46) extends from the bottom surface 44 to an adjacent second locating surface 48 (cutting portion locating surface 48). According to some embodiments, each first locating surface 46 is transverse to a respective adjacent second locating surface 48. Each second locating surface 48 is located on a respective insert cutting portion 34 and extends between the first locating surface 46 and an associated end surface 30.

The insert lower surface 26 further includes two insert abutment surfaces 50 located on opposite ends of the insert clamping portion 22 and facing opposite directions. Each insert abutment surface 50 extends from the bottom surface 44 towards an adjacent second locating surface 48. According to some embodiments, each insert abutment surface 50 is transverse to a respective adjacent second locating surface 48 and the bottom surface 44. The insert abutment surface 50 may be flat.

According to some embodiments, the first locating surfaces 46 may have a concave form defining an insert locating axis A. The concave form may be V-shaped. According to some embodiments, the second locating surfaces 48 may also have a concave form. The concave form of the second locating surfaces 48 may be V-shaped. The insert locating axes A of the two first locating surfaces 46 are skew to one another and in an end view of the cutting insert 16 (see FIG. 3), the insert locating axes A of the two first locating surfaces 46 are transverse to one another and form an angle α therebetween. In a side view of the cutting insert 16 (see FIG. 4) the two insert locating axes A may be parallel to each other. The insert symmetry axis V is located midway between and is parallel to the insert locating axes A (see FIG. 4). The insert abutment surfaces 50 are transverse to each other and to the insert locating axes A.

Figure 8:
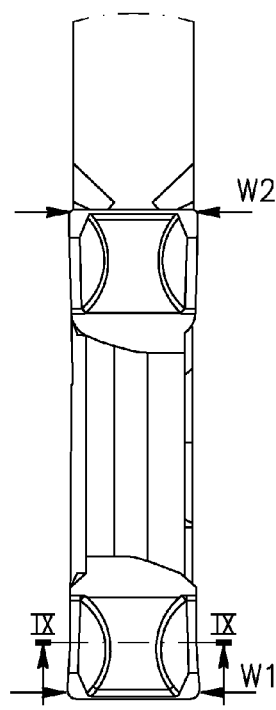
FIG. 8 is a top view of the tool cutting portion of FIG. 1.

As seen in FIG. 4, in a side view of the cutting insert 16, the insert symmetry axis V divides the cutting insert 16 into two halves 90a, 90b. Each half of the cutting insert 16 has an associated insert cutting portion 34 including a front cutting edge 40 having an edge length W1 (see FIG. 8), and an insert locating axis A. The front cutting edge 40 of one half of the cutting insert 16 and the insert locating axis A of the other half of the cutting insert 16 are perpendicular to each other. As will be described hereinbelow, this geometrical characteristic is essential for the correct orientation of the front cutting edges 40 when the cutting insert 16 is seated in the insert holder 14. In the end view of the cutting insert 16 (see FIG. 3) the front cutting edges 40 are straight and form the acute angle α therebetween. A longitudinal axis L of the cutting insert 16 passes through midpoints of the front cutting edges 40. The longitudinal axis L is perpendicular to the insert symmetry axis V and to each front cutting edge 40.

Figure 5:
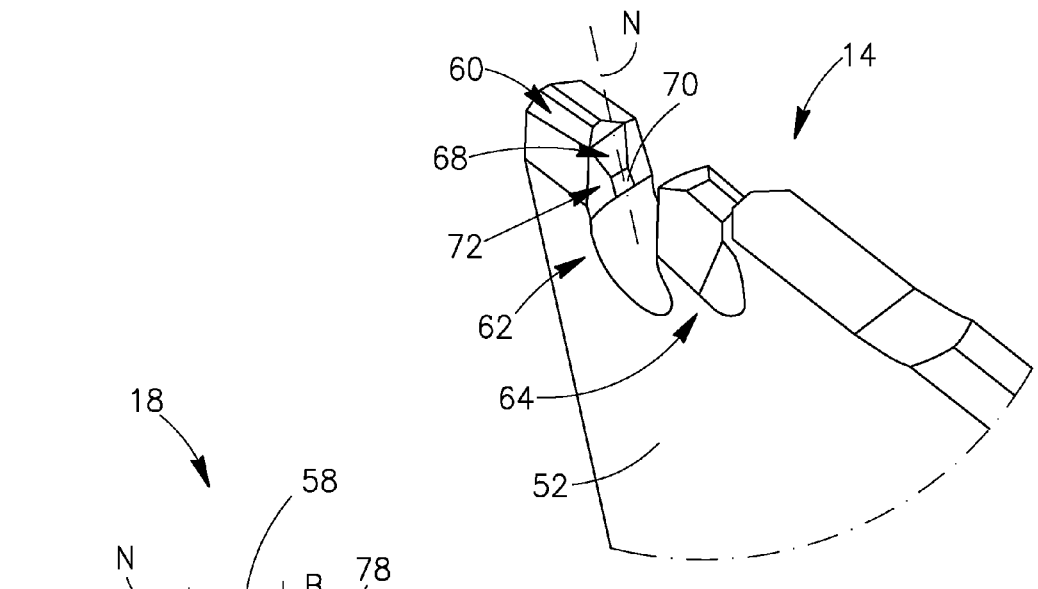
FIG. 5 is a partial isometric top view of the insert pocket of FIG. 1.
Figure 6:
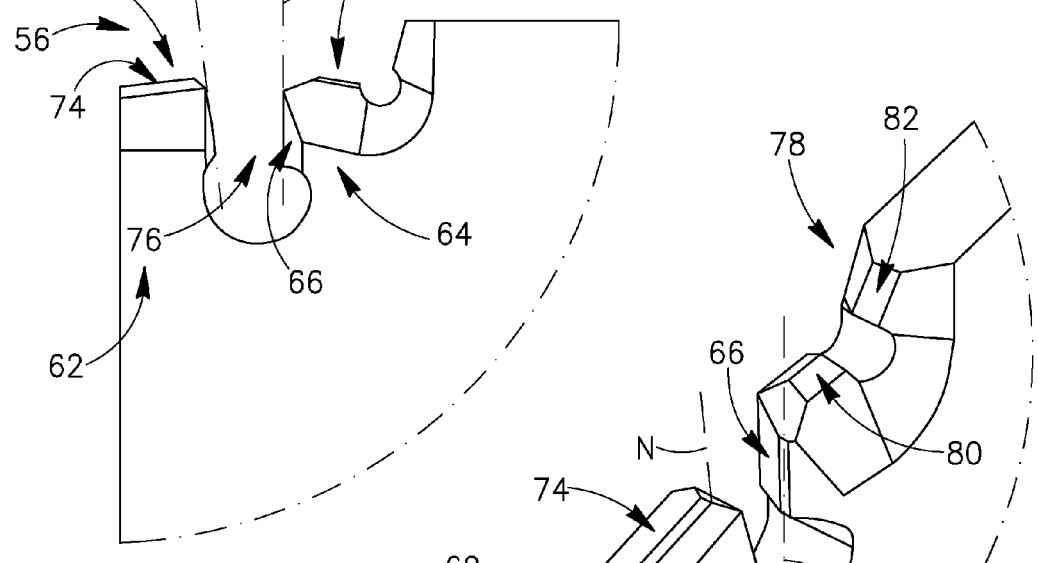
FIG. 6 is a side view of the insert pocket of FIG. 5.
Figure 7:
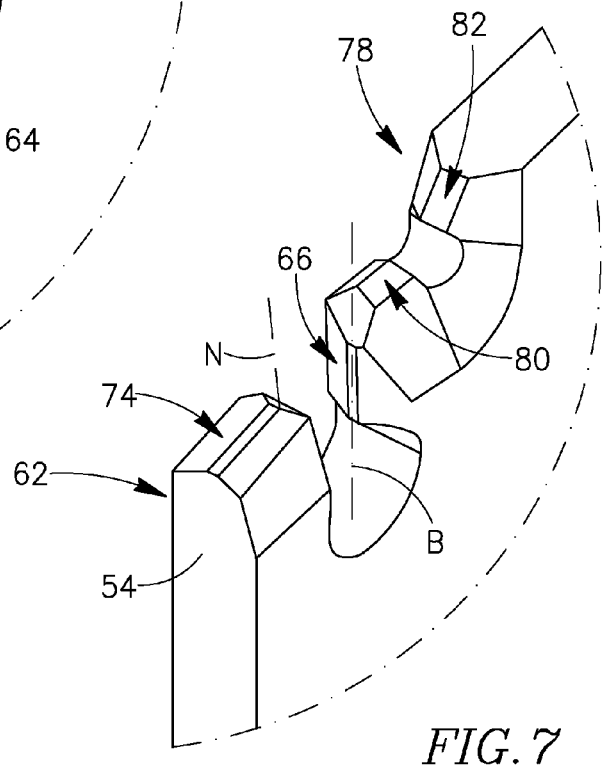
FIG. 7 is an isometric view of the insert pocket of FIG. 5.

Reference is made to FIGS. 5 to 7. The insert holder 14 has two parallel holder side surfaces 52 and a front surface 54 which extends between the holder side surfaces 52. The insert pocket 18 has a pocket upper portion 56 and a pocket clamping portion 58. The pocket upper portion 56 has an upper portion front end 60 adjacent the front surface 54. The pocket clamping portion 58 includes a resilient clamping jaw 62 located at a front end of the insert pocket 18. The pocket clamping portion 58 further includes a rigid base jaw 64 located opposite of the clamping jaw 62. The clamping jaw 62 connects with the rigid base jaw 64 and forms a single integrated piece therewith. The base jaw 64 has a base locating surface 66 and the clamping jaw 62 has a wedge surface 68 facing the base locating surface 66. The base locating surface 66 may have a convex form which defines a longitudinal base locating axis B. The convex form may be V-shaped. The base locating surface 66 is formed to mate with the first locating surface 46 of the cutting insert 16. The convex-concave mating helps to prevent lateral movement of the cutting insert 16 with respect to the insert holder 14.

According to some embodiments, the wedge surface 68 has a wedge abutment surface 70. The wedge abutment surface 70 has a wedge bisector N which equally divides the wedge abutment surface 70 in two. According to embodiments of the invention, the base locating axis B and the wedge bisector N are located midway between, and are parallel to, the holder side surfaces 52 (see FIG. 12). A holder symmetry plane P is defined by the wedge bisector N and the base locating axis B. The wedge abutment surface 70 projects from the wedge surface 68 towards the pocket clamping portion 58. A wedge extension surface 72 located on the wedge surface 68 separates the wedge abutment surface 70 from the holder side surfaces 52 and an upper locating surface 74. The wedge abutment surface 70 and the base locating surface 66 converge downwardly, forming a wedge-like clamping aperture 76 between the clamping jaw 62 and the base jaw 64.

In a side view of the insert holder 14 (see FIG. 6), the pocket upper portion 56 includes a cutting portion housing 78 located further away from the front surface 54 than the pocket clamping portion 58. According to some embodiments, the cutting portion housing 78 includes a housing locating surface 80 and a housing rear surface 82 (see FIG. 7). The housing locating surface 80 may have a convex form which may be V-shaped. The housing locating surface 80 extends from adjacent the base locating surface 66 towards the housing rear surface 82. According to some embodiments, the housing locating surface 80 is transverse to the housing rear surface 82 and the base locating surface 66. The pocket upper portion 56 further includes the upwardly facing upper locating surface 74 located on the clamping jaw 62.

Figure 9:
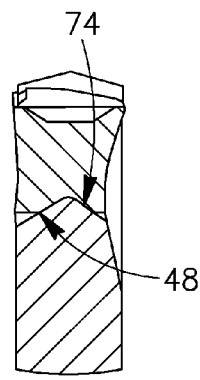
FIG. 9 is a cross section taken along the line X-X of FIG. 8.
Figure 10:
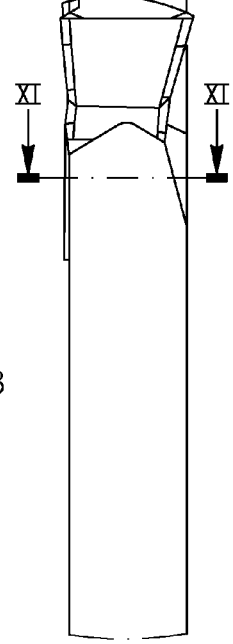
FIG. 10 is an end view of the tool cutting portion of FIG. 1.
Figure 11:
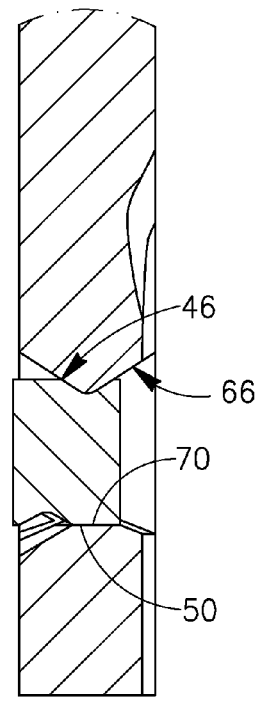
FIG. 11 is a cross-section taken along the line XI-XI of FIG. 10.

According to some embodiments, the upper locating surface 74 may have a convex form. The convex form may be V-shaped. The upper locating surface 74 is formed to mate with the second locating surface 48 of the cutting insert 16. The upper locating surface 74 extends from adjacent the wedge surface 68 to the front surface 54 and is transverse to the wedge surface 68 and the front surface 54 in a side view of the insert holder 14 (see FIG. 6). In order to avoid the arrangement of the two sets of convex-concave mating surfaces, from being over constrained, the wedge abutment surface 70 is chosen to be flat and the upper locating surface 74 is chosen to be convex (see FIGS. 9 and 11).

Reference is made to FIGS. 1 and 8 to 13. When the cutting insert 16 is securely clamped in the insert pocket 18 of the insert holder 14, the body portion 20 is located in the pocket upper portion 56 and the insert clamping portion 22 is located in the pocket clamping portion 58. The insert clamping portion 22 is wedged in the clamping aperture 76, between the clamping jaw 62 and the base jaw 64. One insert cutting portion 34 is located in the cutting portion housing 78 and will be referred to herein as a non-operative cutting portion 34'. A second insert cutting portion 34 is located in the upper portion front end 60 and will be referred to herein as an operative cutting portion 34". The front cutting edges 40 of the operative and non-operative cutting portions 34", 34' will be referred to herein as operative and non-operative cutting edges 40", 40' respectively. The operative cutting edges 34" are those cutting edges that participate in cutting operations.

According to some embodiments, there are three abutment regions at which the cutting insert 16 and the insert pocket 18 engage each other. The first abutment region is formed between a second locating surface 48 associated with the operative insert cutting portion 34 and the upper locating surface 74 (see FIG. 9). The second abutment region is formed between the insert abutment surface 50 and the wedge abutment surface 70 (see FIG. 11). The third abutment region is formed between a first locating surface 46 associated with the non-operative cutting edge 40' and the base locating surface 66 (see FIG. 11). The locating axis A associated with the non-operative insert cutting portion 34 coincides with the base locating axis B.

Figure 12:
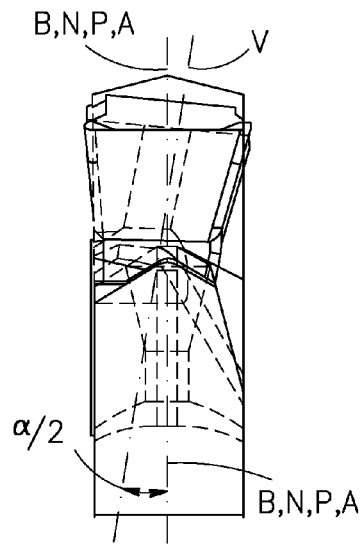
FIG. 12 is an end view of the tool cutting portion of FIG. 1 showing hidden lines.
Figure 13:
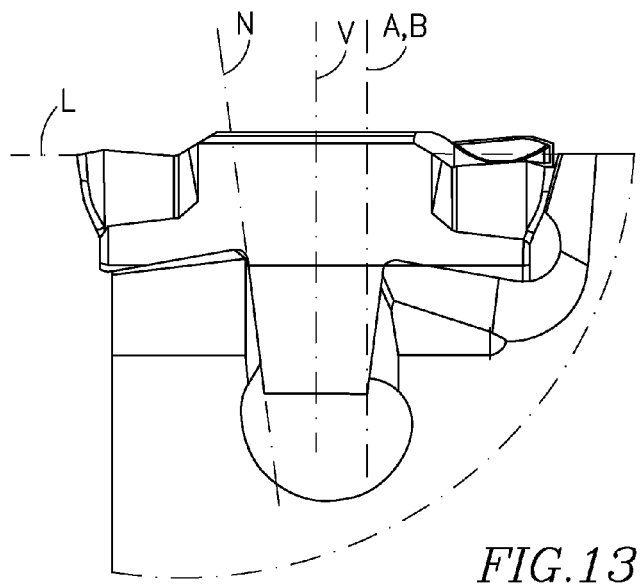
FIG. 13 is a side view of the assembled tool cutting portion of FIG. 1.

In this orientation of the cutting insert 16, the operative cutting edge 40" is perpendicular to the symmetry plane P (see FIG. 12). The edge length W1 of the operative cutting edge 40" is the widest feature of the tool cutting portion 10. Therefore, a groove made in a workpiece by the operative cutting edge 40" will have the same width as the edge length W1. In order to obtain an unlimited depth of cut, the non-operative cutting edge 40' must have a different orientation than that of the operative cutting edge 40". This is therefore achieved, since as explained hereinabove, the front cutting edges 40 form the angle α therebetween. The insert symmetry axis V of the cutting insert 16 forms an angle α/2 with the holder symmetry plane P, consequently the non-operative cutting edge 40' is positioned in the required orientation. In a top view of the tool cutting portion 10 (see FIG. 8), the non-operative cutting edge 40' has a non-operative edge length W2, where W2<W1. In other words, this inclination in combination with the geometric relationship between the front cutting edges 40 will ensure that the non-operative cutting edge 40' is sufficiently rotated about the longitudinal axis L so that it does not engage any portion of the groove, or cause jamming of chips cut by the operative cutting edge 40".

When the assembled tool cutting portion 10 is not machining, the housing locating surface 80 does not abut the cutting insert 16. However, when the cutting tool 12 is used for turning operations (i.e., machining which involves lateral forces), the cutting insert 16 may shift in the insert pocket 18, or rotate with respect to the insert symmetry axis V. Upon such shifting, the second locating surface 48, associated with the non-operative cutting portion 34', may engage the housing locating surface 80, preventing the cutting insert 16 from further shifting in the insert pocket 18.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. An indexable double-ended cutting insert (16) having an insert symmetry axis (V), about which the cutting insert (16) has 180° rotational symmetry, the insert symmetry axis (V) defining an upward to downward direction, the cutting insert (16) comprising:
    an insert upper surface (24), an opposing insert lower surface (26), two opposing insert side surfaces (28) extending therebetween, and opposing end surfaces (30) extending between the insert upper and lower surfaces (24, 26) and between the insert side surfaces (28);
    a longitudinally extending body portion (20) having a central portion (32) and two insert cutting portions (34) located at opposite ends of the body portion (20) and formed integrally with the central portion (32); and
    an insert clamping portion (22) extending downwardly from the central portion (32) in a direction away from the insert upper surface (24);
    each insert cutting portion (34) has a rake surface (36) formed in the insert upper surface (24) and a relief surface (38) adjacent the rake surface (36), the rake and relief surfaces (36, 38) meeting at an edge, at least a portion of the edge forming a front cutting edge (40);
    the insert lower surface (26) comprising a bottom surface (44) located on the insert clamping portion (22) and facing in a direction away from the insert upper surface (24), two insert abutment surfaces (50), two first locating surfaces (46) and two second locating surfaces (48); the two first locating surfaces (46) and two insert abutment surfaces (50) being located on the insert clamping portion (22), each first locating surface (46) and each insert abutment surface (50) extending from the bottom surface (44) towards a respective adjacent second locating surface (48), each second locating surface (48) being located on a respective insert cutting portion (34);
    each first locating surface (46) defining an insert locating axis (A);
    wherein, in an end view of the cutting insert (16):
    the insert locating axes (A) of the first locating surfaces (46) form an acute angle α therebetween, and
    each insert locating axis (A), associated with a front cutting edge (40) on one half of the cutting insert (16), is perpendicular to a front cutting edge (40) located on a second half of the cutting insert (16).

2. The indexable double-ended cutting insert (16) according to claim 1, wherein the insert locating axes (A) are parallel to each other in a side view of the cutting insert (16).

3. The indexable double-ended cutting insert (16) according to claim 1, wherein in a side view of the cutting insert (16) the insert symmetry axis (V) is located midway between and is parallel to the insert locating axes (A).

4. The indexable double-ended cutting insert (16) according to claim 1, wherein the insert abutment surfaces (50) converge downwardly and are inclined to the insert locating axes (A).

5. The indexable double-ended cutting insert (16) according to claim 1, wherein the insert abutment surfaces (50) are flat.

6. The indexable double-ended cutting insert (16) according to claim 1, wherein each insert abutment surface (50) is transverse to an adjacent second locating surface (48) and the bottom surface (44).

7. The indexable double-ended cutting insert (16) according to claim 1, wherein the relief surfaces (38) are located in respective end surfaces (30) and the front cutting edges (40) are straight and form the angle α therebetween.

8. A cutting tool (12) comprising:
    an insert holder (14) having an insert pocket (18); and
    an indexable double-ended cutting insert (16) in accordance with claim 1 retained in the insert pocket (18).

9. The cutting tool (12) according to claim 8, wherein the insert holder (14) comprises:
    two parallel holder side surfaces (52) and a front surface (54) extending between the holder side surfaces (52); and
    an insert pocket (18), the insert pocket (18) having a pocket upper portion (56) and a pocket clamping portion (58) defining an upward to downward direction,
    the pocket clamping portion (58) comprising a resilient clamping jaw (62) at a front end of the insert pocket (18), the clamping jaw (62) having a wedge surface (68), the wedge surface (68) having a wedge abutment surface (70); a wedge extension surface (72) located on the wedge surface (68) separating the wedge abutment surface (70) from the holder side surfaces (52) and from an upwardly facing upper locating surface (74);
    the clamping jaw (62) connected to a rigid base jaw (64) forming a single integrated piece therewith, the base jaw (64) having a base locating surface (66) facing opposite the wedge surface (68),
    the pocket upper portion (56) comprising a cutting portion housing (78) and the upper locating surface (74), the cutting portion housing (78) being located rearward of the pocket clamping portion (58) in a side view of the insert holder (14) and the upper locating surface (74) being located on the clamping jaw (62);
    and wherein:
    the cutting portion housing (78) accommodates a non-operative cutting portion (34') of the cutting insert (16); and
    the upper locating surface (74), the wedge abutment surface (70) and the base locating surface (66) abut given surfaces on the cutting insert (16).

10. A cutting tool (12) comprising:
    an insert holder (14) having an insert pocket (18); and
    an indexable double-ended cutting insert (16) retained in the insert pocket (18), the cutting insert (16) having an insert symmetry axis (V), about which the cutting insert (16) has 180° rotational symmetry, the insert symmetry axis (V) defining an upward to downward direction, the cutting insert (16) comprising:
    an insert upper surface (24), an opposing insert lower surface (26), two opposing insert side surfaces (28) extending therebetween, and opposing end surfaces (30) extending between the insert upper and lower surfaces (24, 26) and between the insert side surfaces (28);
    a longitudinally extending body portion (20) having a central portion (32) and two insert cutting portions (34)

located at opposite ends of the body portion (20) and formed integrally with the central portion (32); and an insert clamping portion (22) extending downwardly from the central portion (32) in a direction away from the insert upper surface (24);

each insert cutting portion (34) has a rake surface (36) formed in the insert upper surface (24) and a relief surface (38) adjacent the rake surface (36), the rake and relief surfaces (36, 38) meeting at an edge, at least a portion of the edge forming a front cutting edge (40);

the insert lower surface (26) comprising a bottom surface (44) located on the insert clamping portion (22) and facing in a direction away from the insert upper surface (24), two insert abutment surfaces (50), two first locating surfaces (46) and two second locating surfaces (48); the two first locating surfaces (46) and two insert abutment surfaces (50) being located on the insert clamping portion (22), each first locating surface (46) and each insert abutment surface (50) extending from the bottom surface (44) towards a respective adjacent second locating surface (48), each second locating surface (48) being located on a respective insert cutting portion (34);

each first locating surface (46) defining an insert locating axis (A);

wherein, in an end view of the cutting insert (16), the insert locating axes (A) of the first locating surfaces (46) form an acute angle α therebetween;

wherein the insert holder (14) comprises:

two parallel holder side surfaces (52) and a front surface (54) extending between the holder side surfaces (52); and an insert pocket (18), the insert pocket (18) having a pocket upper portion (56) and a pocket clamping portion (58) defining an upward to downward direction, the pocket clamping portion (58) comprising a resilient clamping jaw (62) at a front end of the insert pocket (18), the clamping jaw (62) having a wedge surface (68), the wedge surface (68) having a wedge abutment surface (70); a wedge extension surface (72) located on the wedge surface (68) separating the wedge abutment surface (70) from the holder side surfaces (52) and from an upwardly facing upper locating surface (74);

the clamping jaw (62) connected to a rigid base jaw (64) forming a single integrated piece therewith, the base jaw (64) having a base locating surface (66) facing opposite the wedge surface (68), the pocket upper portion (56) comprising a cutting portion housing (78) and the upper locating surface (74), the cutting portion housing (78) being located rearward of the pocket clamping portion (58) in a side view of the insert holder (14) and the upper locating surface (74) being located on the clamping jaw (62);

and wherein:

the cutting portion housing (78) accommodates a non-operative cutting portion (34') of the cutting insert (16);

the upper locating surface (74), the wedge abutment surface (70) and the base locating surface (66) abut given surfaces on the cutting insert (16);

the second locating surface (48) associated with an operative cutting portion (34") abuts the upper locating surface (74) of the insert holder (14);

the insert abutment surface (50) associated with the operative cutting portion (34") abuts the wedge abutment surface (70) of the insert holder (14); and the first locating surface (46) associated with the non-operative cutting portion (34') abuts the base locating surface (66) of the insert holder (14).

11. The cutting tool (12) according to claim 10, wherein when the cutting tool (12) performs a machining operation, the second locating surface (48) associated with the non-operative cutting portion (34') abuts the housing locating surface (80).

12. An indexable double-ended cutting insert (16) having an insert symmetry axis (V), about which the cutting insert (16) has 180° rotational symmetry, the insert symmetry axis (V) defining an upward to downward direction and dividing the cutting insert into two halves (90a, 90b) in a side view of the cutting insert, the cutting insert comprising:

a longitudinally extending body portion (20) comprising a central portion (32) and two insert cutting portions (34) located at opposite ends of the body portion (20) and formed integrally with the central portion (32);

an insert clamping portion (22) extending downwardly from the central portion (32) along the vertical insert symmetry axis (V);

wherein:

each half (90a, 90b) of the cutting insert has an associated cutting portion (34) and comprises:

a cutting portion locating surface (48) located on an underside of the associated cutting portion (34);

an insert abutment surface (50) located on the insert clamping portion (22) and extending towards the cutting portion locating surface (48); and a clamping portion locating surface (46) located on the insert clamping portion (22) and also extending towards the cutting portion locating surface (48), the clamping portion locating surface (46) defining an insert locating axis (A); and in an end view of the cutting insert (16):

the insert locating axes (A) of the clamping portion locating surfaces (46) belonging to the different halves (90a, 90b) form an acute angle α therebetween; and each insert locating axis (A), associated with a front cutting edge (40) on one half (90a) of the cutting insert (16), is perpendicular to a front cutting edge (40) located on a second half (90b) of the cutting insert (16).

* * * * *